United States Patent
Tsotsis

(10) Patent No.: US 8,435,628 B2
(45) Date of Patent: May 7, 2013

(54) CONTINUOUS, CARBON- NANOTUBE-REINFORCED POLYMER PRECURSORS AND CARBON FIBERS

(75) Inventor: Thomas Karl Tsotsis, Orange, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/463,336

(22) Filed: May 3, 2012

(65) Prior Publication Data

US 2012/0213985 A1   Aug. 23, 2012

Related U.S. Application Data

(62) Division of application No. 12/269,563, filed on Nov. 12, 2008, now Pat. No. 8,187,700.

(51) Int. Cl.
*B32B 5/02* (2006.01)
*C08L 55/00* (2006.01)

(52) U.S. Cl.
USPC ........... 428/221; 524/502; 524/496; 524/565; 423/447.2; 977/742; 428/367; 428/373

(58) Field of Classification Search ........... 524/496, 524/565, 502; 423/447.2; 977/742; 428/221, 428/367, 373
See application file for complete search history.

(56) References Cited

U.S. PATENT DOCUMENTS

| | | | |
|---|---|---|---|
| 5,021,497 A | 6/1991 | Ohara et al. | |
| 5,032,250 A | 7/1991 | Romine et al. | |
| 5,162,074 A | 11/1992 | Hills | |
| 6,583,075 B1 | 6/2003 | Dugan | |
| 6,852,410 B2 | 2/2005 | Veedu et al. | |
| 7,153,452 B2 | 12/2006 | Ogale et al. | |
| 7,790,135 B2 | 9/2010 | Lennhoff | |
| 2007/0082197 A1 | 4/2007 | Ko et al. | |
| 2010/0221526 A1 | 9/2010 | Ueno et al. | |
| 2010/0272978 A1 | 10/2010 | Kumar et al. | |

OTHER PUBLICATIONS

Chae et al., "Carbon nanotube reinforced small diameter polyacrylonitrile based carbon fiber", *Composite Science* (2008), pp. 1-8.
Chae et al., "Making Strong Fibers", *Science*, vol. 319, Feb. 15, 2008, pp. 908-909.
Chae et al., "Oriented and exfoliated single wall carbon nanotubes in polyacrylonitrile", *Polymer*, 47 (2006), p. 3494-3504.
Chae et al., "Stabilization and carbonization of gel spun polyacrylonitrile/single wall carbon nanotube composite fibers", *Polymer* 48 (2007), pp. 3781-3789.
Lam et al., "Electrospinning of Carbon Nanotube Reinforced Nanocomposite Fibrils and Yarns", *Materials Research Society*, 1995-2008, 1 page.
Sreekumar et al., "Polyacrylonitrile Single-Walled Carbon Nanotube Composite Fibers", *Advanced Materials*, 2004, 16, No. 1, pp. 58-61.

*Primary Examiner* — Robert D. Harlan
(74) *Attorney, Agent, or Firm* — Alston & Bird LLP

(57) ABSTRACT

The present invention relates to a continuous, carbon fiber with nanoscale features comprising carbon and carbon nanotubes, wherein the nanotubes are substantially aligned along a longitudinal axis of the fiber. Also provided is a polyacrylonitrile (PAN) precursor including about 50% to about 99.9% by weight of a melt-spinnable PAN and about 0.01% to about 10% of carbon nanotubes. Other precursor materials such as polyphenylene sulfide, pitch and solution-spinnable PAN are also provided. The precursor can also include a fugitive polymer which is dissociable from the precursor polymer.

19 Claims, 2 Drawing Sheets

CONTINUOUS, CARBON-NANOTUBE-REINFORCED POLYMER PRECURSORS AND CARBON FIBERS

CROSS-REFERENCE TO RELATED APPLICATIONS

This application is a divisional of U.S. application Ser. No. 12/269,563, filed Nov. 12, 2008, which is hereby incorporated herein in its entirety by reference.

BACKGROUND OF THE INVENTION

1. Field of the Invention

The present invention relates generally to continuous carbon nanofiber structures including carbon nanotubes and polymer (especially polyacrylonitrile) precursors including an acrylonitrile-containing polymer and carbon nanotubes.

2. Description of Related Art

It is well known that, as a general rule, as the diameter of carbon fibers is decreased, strength generally increases. The reasons for this are usually ascribed to improved molecular orientation (e.g., increased graphitic structure) and to a reduction in the number of flaws due to the improved quality of the cross-sectional filament structure. At the extreme of the continuum lie carbon nanotubes, which ideally are fully graphitic without flaws in the structure of the walls. However, the realization of the potential of the mechanical benefits of these materials is hindered by the requirement of having to transfer load along the fiber length between fibers via mechanical entanglements caused by frictional and van der Waal's interactions between the carbon nanotubes themselves and between adjacent fibers through shear coupling such as from a matrix resin.

Currently, continuous carbon fibers with nanoscale features are not available except on the research level. Most carbon fibers with nanoscale features are either carbon nanotubes or carbon nanofibers. Carbon nanofibers are generally vapor-grown or electrospun. Vapor-grown carbon fibers typically comprise a range of lengths and are not continuous. By contrast, electrospun carbon fibers can be made continuously. However, there are many shortcomings to electrospinning.

In electrospinning an electric field is generated between an oppositely charged polymer fluid and a fiber-collection ground plate. A polymer solution is added to a glass syringe with a capillary tip. As the electrical potential is increased, the charged polymer solution is attracted to the screen. Once the voltage reaches a critical value, the charge overcomes the surface tension of the polymer cone formed on the capillary tip of the syringe and a jet of ultrafine fibers is produced. As the charged fibers are splayed, the solvent quickly evaporates and the solidified fibers are accumulated randomly on the surface of the collection screen. This results in a nonwoven mesh of nano to micron scale fibers. Varying charge density, polymer solution concentration and the duration of electrospinning can control fiber diameter and mesh thickness.

The first problem with electrospinning is related to the difficulty in collecting and collimating the fibers in order to handle them as ordered fibers. Currently, it is only possible on length scales of several inches to one foot. Second, and perhaps more important, electrospinning heads may not be placed in too close of proximity to each other as the electric fields emanating from each head can interfere with the other. Due to this limitation, in order to produce a large number of fiber ends, a commercially impractical area would be required to accommodate these on a production floor. Customarily, a large number of fiber ends are needed because, in order to approximate the typical 3-24000 filament ends (5-10 microns in diameter) present in commercial carbon tows in cross-sectional area, somewhere between 1000 and 10,000 times as many ends would be needed, thereby necessitating several million electrospinning heads to achieve this goal. For large-volume production of continuous fibers, this becomes untenable.

New research suggests that polymer/carbon nanotube composite films and fibers could potentially provide materials having improved tensile strength. To date, however, only spinning of carbon nanotubes into yarns and direct electrospinning of nanocarbon fibers have been demonstrated for continuous nanocarbon fibers. Prior to the present invention, no work has been demonstrated with carbon fibers with nanoscale features.

As such, there remains a need for continuous carbon fibers with nanoscale features. More specifically, there remains a need for a continuous carbon-nanotube-reinforced carbon fibers with nanoscale features. Additionally, there remains a need for a method of producing a continuous carbon-nanotube reinforced carbon fiber with nanoscale features. More specifically there remains a need for a cost-effective method of producing a large-volume of continuous carbon-nanotube reinforced carbon fibers with nanoscale features such that their use in composites-based, primary load-bearing structures such as for aircraft is practical. Moreover, there remains a need for both melt-spinnable and solution-spinnable methods for producing continuous, carbon-nanotube-reinforced carbon fibers with nanoscale features.

BRIEF SUMMARY OF THE INVENTION

The present invention satisfies at least some of the aforementioned needs by providing continuous, carbon fibers with nanoscale structures, that are reinforced with carbon nanotubes. In one embodiment, the carbon fiber comprises carbon and carbon nanotubes, wherein the nanotubes are substantially aligned along a longitudinal axis of the fiber. The carbon-nanotube-reinforced carbon fibers with nanoscale features can comprise either solid or hollow fibers. In another embodiment, a carbon fiber can include numerous internal hollow fibers bundled within a resultant filament. Such embodiments can include a honeycomb-like cross section. As such, these embodiments can comprise an overall resultant filament with nanoscale wall thicknesses between adjacent hollow-cylinder-like portions of the honeycomb cross section.

In another aspect, the invention provides a polyacrylonitrile (PAN) precursor. According to embodiments of the present invention, the PAN precursor can comprise about 50% to about 99.9% by weight of a melt-spinnable PAN and about 0.01% to about 10% of carbon nanotubes. In certain embodiments, the PAN precursor includes a fugitive polymer which is dissociable from the melt-spinnable PAN.

In yet another aspect, the invention provides a method of forming a continuous carbon-nanotube-reinforced carbon fiber structure with nanoscale features. One method according to an embodiment of the present invention includes providing a resin mixture comprising from about 50 to about 99.9% of a melt-spinnable-polyacrylonitrile (PAN) and from about 0.05% to about 10% of carbon nanotubes. The resin mixture is extruded and fed into a spin-pack assembly capable of producing fibers comprising nanoscale dimensions and substantially aligning the carbon nanotubes with the PAN. Next, the resulting PAN/carbon nanotube fibers are oxidized by sufficiently heating the fibers. The oxidized fibers can be subjected to a carbonization process comprising the heating of the oxidized fibers to a temperature ranging from about 600 to about 3000° C. In certain embodiments, the method also includes providing a fugitive polymer which is dissociable from the melt-spinnable PAN. Preferably, the two components (i.e., the resin mixture and the fugitive polymer) are separately extruded and fed into a spin-pack assembly capable of producing multi-component fibers comprising nanoscale dimensions in an islands-in-a-sea configuration and substantially aligning the carbon nanotubes with the PAN. Preferably, the fugitive polymer is removed by extraction or the like.

In another embodiment of the invention, solution-spinnable or gel-spinnable PAN can be used in a similar manner to that described above.

Likewise, in certain embodiments other polymers, such as pitch (especially mesophase pitch) or polyphenylene sulfide may be substituted for the melt-spinnable PAN in the melt-spinning described herein.

BRIEF DESCRIPTION OF THE SEVERAL VIEWS OF THE FIGURE(S)

Having thus described the invention in general terms, reference will now be made to the accompanying figures, wherein:

DETAILED DESCRIPTION OF THE INVENTION

Figure 1:
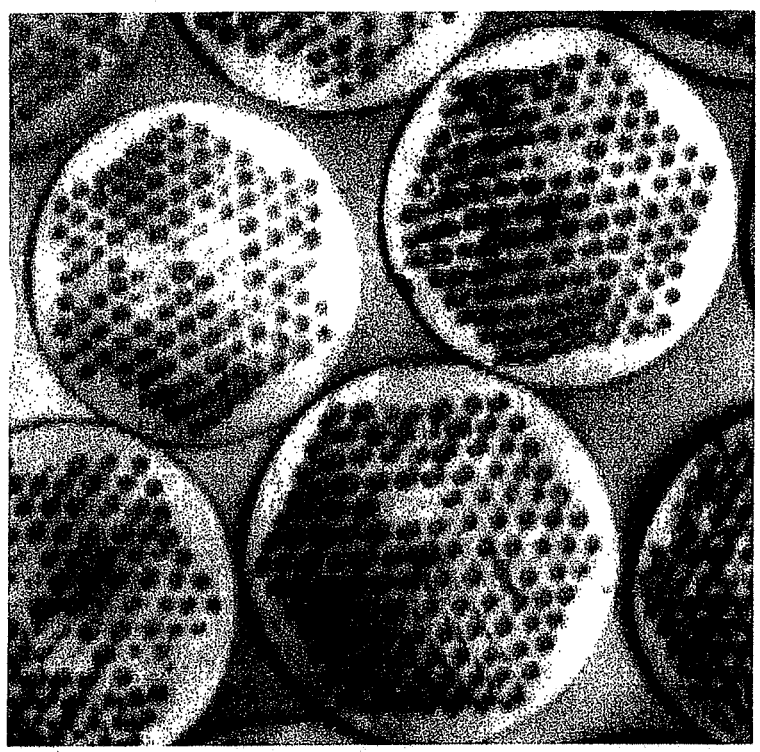
FIG. 1 illustrates a cross sectional view of an "islands-in-a-sea" PAN precursor having multiple islands comprising a PAN and a sea comprising a fugitive polymer.

In one aspect, the present invention comprises a continuous carbon-nanofiber structure comprising carbon and carbon nanotubes, wherein the nanotubes are substantially aligned along a longitudinal axis of the fiber. In certain embodiments, the continuous carbon nanofiber can be made directly from a melt-spinnable polyacrylonitrile (PAN) precursor. Other embodiments can be made by utilizing a spin pack capable of producing multi-component fibers. In preferred embodiments, the resultant multi-component fibers comprise an islands-in-the-sea configuration, wherein the multi-component fibers comprise a PAN and a fugitive polymer which can be dissociable from the melt spinnable PAN.

As used herein, the term "fugitive polymer" refers to compounds that can be extracted out of a multi-component fiber after melt spinning, but at any one of several points of the fiber-making process. In general, multi-component fibers are formed of two or more polymeric materials which have been extruded together to provide continuous contiguous polymer segments which extend down the length of the fiber.

The fugitive polymer, for example, can include water-soluble polymers, such as but not limited to, polyvinyl alcohol, polyethylene oxide, polyacrylamide, polylactic acid, water-soluble copolyester resins, and copolymers, terpolymers, and mixtures thereof. Other additives, such as basic or ionic compounds, may be added to an aqueous bath to aid in dissolution, as is known in the art. For example, polylactic acid can be soluble in caustic aqueous solutions. Alternatively the fugitive polymer can include a solvent-extractable polymer, such as polystyrene. In certain embodiments of the invention, the fugitive polymer is typically extracted from the multi-component fiber using a suitable solvent after melt spinning but before heat treatment to carbonize the PAN component.

Alternatively, the fugitive component can include a polymer which forms a char upon heat treatment such as that generally associated with the carbonization of PAN polymers. The charred residual component can then be extracted or removed from the multi-component fibers generally using mechanical means, such as impingement by high pressure air or water jets.

The term "fiber" as used herein means both fibers of finite length, such as conventional staple fiber, as well as substantially continuous structures, such as filaments, unless otherwise indicated.

In general, the melt-spinnable PAN and fugitive polymer components are chosen so as to be mutually incompatible. In particular, the polymer components do not substantially mix together or enter into chemical reactions with each other. Specifically, when spun together to form a composite fiber, the polymer components exhibit a distinct phase boundary between them so that substantially no blend polymers are formed, preventing dissociation. The various components should have the appropriate solubility characteristics, such that the fugitive polymer is soluble in solvent (if removed using a solvent-extraction process), while the insoluble polymer must be capable of withstanding the extraction of the fugitive polymer without detriment. In addition, a balance of adhesion/incompatibility between the components of the composite fiber is considered highly beneficial. The components advantageously adhere sufficiently to each other to allow the pre-extracted multi-component fiber to be subjected to conventional textile processing such as winding, twisting, weaving, knitting or carding without any appreciable separation of the components, if so desired. Conversely, the polymers should be sufficiently incompatible so that adhesion between the components is sufficiently weak, so as to provide ready dissolution during the extraction process.

According to preferred embodiments of the present invention, a melt-spinnable PAN is subjected to melt spinning. As used herein, the term "polyacrylonitrile (PAN)" polymer includes polymers comprising at least about 85% by weight acrylonitrile units (generally known in the art as acrylic or polyacrylonitrile polymers). This term as used herein also includes polymers which have less that 85% by weight acrylonitrile units. Such polymers include modacrylic polymers, generally defined as polymers comprising 35-85% by weight acrylonitrile units and typically copolymerized with vinyl chloride or vinylidene chloride. Preferably, the polyacrylonitrile polymer has at least 85% by weight polyacrylonitrile units. Other polymers known in the art to be suitable precursors for carbon and graphite fibers, such as polyvinyl alcohol, aromatic polyamides, or poly(acetylenes), may be suitable for use in the present invention, if capable of extrusion by melt spinning.

Exemplary melt-processable polyacrylonitriles are described in U.S. Pat. Nos. 5,602,222, 5,618,901 and 5,902,530 the entire disclosure of each of which is hereby incorporated by reference. Such polymers are commercially available, for example, from BP Chemicals as the "Amlon™" acrylic polymers, "Barex®" acrylic polymers, and the like. See International Fiber Journal, p. 42, April 1998, hereby incorporated by reference in its entirety. In one preferred embodiment, the PAN polymer comprises Amlon™.

Melt-processable/spinnable PANs are particularly attractive for use in the present invention because they are excellent precursors for the formation of carbon fibers. In addition, melt-processable PANs exhibit adequate heat resistance, with a melting point of approximately 185° C. Polyacrylonitrile fibers also exhibit good tensile strength and resilience. In addition, polyacrylonitrile fibers are especially advantageous in those embodiments employing dissolution as a means of extraction, because polyacrylonitrile possesses superior water and chemical resistance, thus allowing a wide range of solvents to be employed in the dissolution of the fugitive component.

In addition to containing acrylonitrile monomer, melt-processable polyacrylonitrile polymers can also include olefinically unsaturated monomer. The acrylonitrile olefinically unsaturated polymer is preferably made up of about 50 weight % to about 95 weight %, preferably about 75 weight % to about 93 weight %, and most preferably about 85 weight % to about 92 weight %, of polymerized acrylonitrile monomer, and at least one of about 5 weight % to about 50 weight %, preferably about 7 weight % to about 25 weight %, and most preferably about 8 weight % to about 15 weight %, of polymerized olefinically unsaturated monomer.

In certain embodiments, the olefinically unsaturated monomer can include one or more of an olefinically unsaturated monomer with a C=C double bond polymerizable with an acrylonitrile monomer. The olefinically unsaturated monomer can be a single polymerizable monomer resulting in a co-polymer, or a combination of polymerizable monomers resulting in a multi-polymer. The choice of olefinically unsaturated monomer or a combination of monomers can depend upon the properties desired to impart to the resulting fiber and its end use. The olefinically unsaturated monomer generally includes, but is not limited to, acrylates such as methyl acrylates and ethyl acrylates; methacrylates, such as methyl methacrylate; acrylamides and methacrylamides and each of their N-substituted alkyl and aryl derivatives, such as acrylamide, methacrylamide, N-methylacrylamide, N,N-dimethyl acrylamide; maleic acid and its derivatives, such as N-phenylmaleimide; vinylesters, such as vinyl acetate; vinylethers, such as ethyl vinyl ether and butyl vinyl ether; vinylamides, such as vinyl pyrrolidone; vinylketones, such as ethyl vinyl ketone and butyl vinyl ketone; styrenes, such as methylstyrene, styrene and indene; halogen-containing monomers, such as vinyl chloride, vinyl bromide, and vinylidene chloride; ionic monomers, such as sodium vinylsulfonate, sodium styrenesulfonate, and sodium methyl sulfonate; acid containing monomers such as itaconic acid, styrene sulfonic acid and vinyl sulfonic acid; base-containing monomers, such as vinyl pyridine, 2-aminoethyl-N-acrylamide, 3-aminopropyl-N-acrylamide, 2-aminoethylacrylate, 2-aminoethylmethacrylate; and olefins, such as propylene, ethylene, isobutylene. Other monomers, such as vinyl acetate, acrylic esters, and vinyl pyrrolidone, may also be included in conventional polyacrylonitrile in small amounts, to allow the resulting polyacrylonitrile fiber to be dyed with conventional textile dyes. Additional properties may also be imparted to melt-processable polymers containing significant amounts of acrylonitrile by choosing appropriate co-monomers or blends thereof. For example, the inclusion of styrene in the polymer results in improved heat distortion; isobutylene improves the flexibility; halogen-containing monomers increase the flame resistance of the polymer. Still further, the acrylonitrile polymer can include methacrylonitrile monomer. The use of such co-monomers is discussed in more detail in U.S. Pat. Nos. 5,602,222 and 5,618,901.

Embodiments of the present invention comprise carbon fibers containing nanoscale structures within their cross section, preferably being continuous, having carbon nanotubes which are substantially aligned along a longitudinal axis of the fiber due to the geometric constraints imposed by the spin pack, which is discussed in further detail below. More specifically, the geometric constraints imposed by the choice of spin pack, according to various embodiments, helps cause the polymer molecules and the carbon nanotubes to become substantially aligned. In various embodiments, single-wall or multi-wall carbon nanotubes can be utilized.

Single-wall carbon nanotubes can be made from any known means, such as by gas-phase synthesis from high-temperature, high-pressure carbon monoxide, catalytic vapor deposition using carbon-containing feedstocks and metal catalyst particles, laser ablation, arc method, or any other method for synthesizing single-wall carbon nanotubes. The single-wall carbon nanotubes obtained from synthesis are generally in the form of single-wall-carbon-nanotube powder.

In one embodiment, single-wall-carbon-nanotube powder is purified to remove non-nanotube carbon, such as amorphous carbon and metallic catalyst residues. Metals, such as Group VIB and/or VIIIB, are possible catalysts for the synthesis of single-wall carbon nanotubes. After catalysis, the metallic residues may be encapsulated in non-nanotube carbon, such as graphitic shells of carbon. The metallic impurities may also be oxidized through contact with air or by oxidation of the non-nanotube carbon during purification.

In one aspect, the invention comprises a polyacrylonitrile (PAN) precursor including from about 50% to about 99.9% by weight of a melt spinnable PAN and about 0.05% to about 10% of carbon nanotubes. In one embodiment the PAN precursor can comprise solid fiber having an outside diameter ranging from 20 to 1000 nanometers, or 50 to 950, or 100 to 900, or 250 to 600 nanometers. In one alternative embodiment, the PAN precursor can comprise hollow fibers having the an outside diameter ranging from 20 to 1000 nanometers, or 50 to 950, or 100 to 800, or 250 to 600 nanometers. In certain embodiments, the wall thickness of the hollow precursor can range from 10 to 500 nanometers, or from 100 to 400 nanometers, or from 200 to 300 nanometers. According to another embodiment, the wall thickness of the hollow precursor can range from 10 to 150 nanometers, or from 20 to 100 nanometers, or 35 to 70 nanometers. In alternative embodiments, the PAN precursors can comprise an outside diameter from about 1 micron to about 50 microns, or from about 1 micron to about 10 microns, with a wall diameter ranging from 10 to 500 nanometers, or from 100 to 400 nanometers, or from 200 to 300 nanometers. According to another embodiment, the wall thickness of the hollow precursor can range from 10 to 150 nanometers, or from 20 to 100 nanometers, or 35 to 70 nanometers.

In another embodiment, the PAN precursor also includes a fugitive polymer which is dissociable from the melt-spinnable PAN as discussed above. In various embodiments, the fugitive polymer can comprise a water-soluble polymer or an organic-solvent-extractable polymer as provided above. In preferred embodiments, the fugitive polymer can comprise polylactic acid or a polyester.

In certain embodiments, the PAN precursor comprises an islands-in-the-sea configuration. In various embodiments, the PAN polymer comprises a plurality of solid islands and the fugitive polymer comprises the sea. For example, FIG. 1 illustrates a cross sectional view of an "islands-in-a-sea" PAN precursor 1 having multiple islands 20 comprising PAN, which are surrounded by a sea 30 comprising a fugitive polymer. The number of PAN polymer islands can be varied as can their diameters. For example, the number of islands can range from 50 to 2000, or 300 to 1500, or 500 to 1000 islands. The outside diameter of the PAN islands can also be controlled by choice of spin pack. For example, the diameter of the PAN islands can range from 20 to 1000 nanometers, or 50 to 950, or 100 to 900, or 250 to 600 nanometers.

In an alternative embodiment, the PAN precursor comprises an islands-in-the-sea configuration comprising a plurality of hollow PAN islands with a fugitive polymer comprising the sea. The number of hollow PAN polymer islands can be varied as can their diameters. For example, the number of islands can range from 50 to 2000, or 300 to 1500, or 500 to 1000 islands. The outside diameter of the hollow PAN islands can also be controlled by choice of spin pack. For example, the diameter of the hollow PAN islands can range from 20 to 1000 nanometers, or 50 to 950, or 100 to 900, or 250 to 600 nanometers. Furthermore the wall thickness of the hollow PAN islands can be varied to include the dimensions described above.

In various embodiments, the weight ratio of the PAN to the fugitive polymer ranges from about 20/80 to about 80/20. Alternatively, the islands-in-the-sea embodiments can also be characterized by their island/sea ratio. The island/sea ratio can also range from 20/80 to 80/20. In one preferred embodiment, the island/sea ratio ranges from 40/60 to 50/50.

In yet another embodiment, the PAN precursor comprises an islands-in-the-sea configuration such that the fugitive polymer comprises a plurality of islands and the PAN (i.e. PAN/carbon nanotubes) comprises the sea. As discussed above, the number of islands and their dimensions can be controlled or tailored to meet a specific need. As such, the diameter of the fugitive polymer islands can range from 20 to 1000 nanometers, or 50 to 950, or 100 to 900, or 250 to 600 nanometers. In various embodiments, the weight ratio of the PAN to the fugitive polymer ranges from about 20/80 to about 80/20. Alternatively, the islands-in-the-sea embodiments can also be characterized by their Island/Sea ratio. The island/sea ratio can also range from 20/80 to 80/20. In one preferred embodiment, the island/sea ratio ranges from 40/60 to 50/50.

Beneficially, PAN-precursor embodiments comprising the islands-in-the-sea configuration can provide environmental benefits since a large number of fiber ends can be produced from a single PAN precursor. In embodiments comprising a PAN polymer as the sea, the fugitive polymer can be washed away (e.g., extracted from the multi-component fiber) to leave behind a PAN precursor having a honeycomb-like cross section. Such embodiments include an outer wall and a plurality on integral internal walls. As such, a substantially hollow (e.g., hollow but for the internal PAN walls) PAN fiber can be obtained with the benefit of having numerous internal hollow fibers bundled within. In various embodiments, the outer wall can comprise numerous shapes. For example, the outer wall can comprise a circle, square, or multi-nodal outer configuration.

As such, the resulting carbon nanotube reinforced PAN fibers of the present invention can beneficially be graphitized into structural carbon fibers. Such carbon nanotube reinforced PAN fibers can include nanotube dimensions to provide improved properties of over conventional PAN-based carbon fibers as well as carbon nanotube-reinforced micron-scaled PAN-based carbon fibers previously developed. The PAN precursors can have the fugitive polymer, if present, washed away, oxidized, and subjected to a carbonization treatment to produce a carbon fiber.

In one embodiment according to the present invention, a continuous carbon fiber structure with nanoscale features is provided. The fibers include carbon and carbon nanotubes and have an outside diameter. Notably, the nanotubes are substantially aligned along a longitudinal axis of the fiber. In one embodiment, the outside diameter ranges from about 20 to about 1000 nanometers, or from about 20 to about 750 nanometers, or from about 50 to 500 nanometers, or from about 50 to 250 nanometers.

According to various embodiments, the carbon-fiber structure can comprise either a solid or hollow carbon fiber comprising a wall formed of carbon and carbon nanotubes. In these embodiments, the nanotubes are preferably substantially aligned along a longitudinal axis of the fiber. In preferred embodiments, the fiber structure comprises a percentage of carbon nanotubes ranging from about 0.05% to about 10% by weight, or from about 0.1% to about 5% by weight, or more preferably from about 0.1% to about 1% by weight. The outside diameter of the carbon fibers can be varied to fit a desired need or to provide desired properties. For instance the outside diameter of the carbon fiber can range from 20 to about 1000 nanometers, or from about 50 to about 950, or 100 to about 900, or 250 to about 700 nanometers.

In certain embodiments, the carbon-fiber structure comprises a hollow-fiber structure comprising a wall formed of carbon and carbon nanotubes. The thickness of the wall can range from range from about 10 to about 500 nanometers. In alternative embodiments, the carbon fiber can comprise an outside diameter of the fiber structure comprises from about 1 micron to about 50 microns, or from about 1 micron to about 10 microns, or from about 100 to about 900 nanometers. As such, embodiments of the present invention can include solid or hollow continuous carbon fibers with diameters, wall thicknesses, or both in the nanoscale. Such carbon fibers may have excellent mechanical properties suitable for manufacture of composite materials using traditional manufacturing processes such as laminating, weaving, etc.

Figure 2:
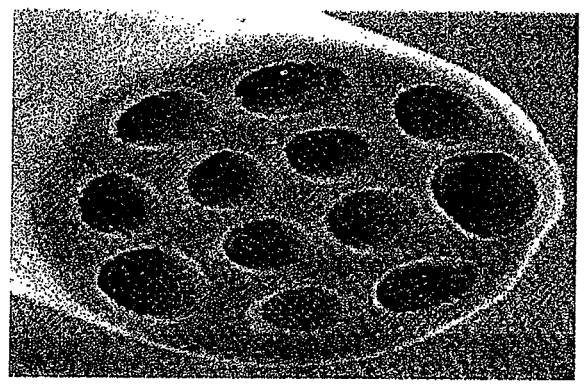
FIG. 2 illustrates a cross-sectional view of a carbon nanofiber according to one embodiment of the present invention, wherein the fiber has a honeycomb-like cross section where the islands have been removed from an islands-in-a-sea filament to leave a continuous honeycomb-like cross section.
Figure 3:
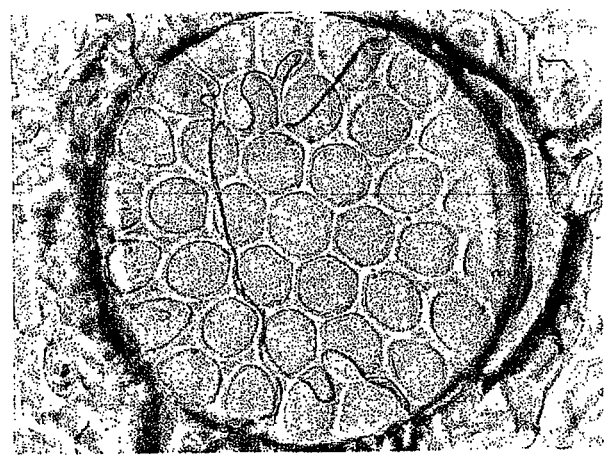
FIG. 3 illustrates a cross-sectional view of a carbon nanofiber according to another embodiment of the present invention, wherein the fiber has a honeycomb-like cross section where the islands have been removed from an islands-in-a-sea filament to leave a continuous honeycomb-like cross section.

As shown in FIGS. 2 and 3, certain preferred embodiments comprise a carbon-fiber structure 50 comprises a substantially hollow fiber comprising an outer wall 60 having an outside diameter and multiple internal walls 70 defining multiple integral internal hollow fibers 80 such that the fiber structure comprises a honeycomb-like cross section. Such embodiments include an outer wall 60 and a plurality on integral internal walls 70. As such, a substantially hollow (e.g., hollow but for the internal walls defining multiple internal hollow carbon fibers therein) carbon fiber can be obtained with the benefit of having numerous internal hollow fibers bundled within. For instance, the honeycomb-like morphology can comprise an overall resultant filament with nanoscale wall thicknesses between adjacent hollow cylinder-like portions of the honeycomb cross section. In various embodiments, the outer wall can comprise numerous shapes. For example, the outer wall can comprise a circle, square, or multi-nodal outer configuration. In various embodiments, the outer wall comprises a thickness ranging from about 10 to about 500 nanometers. In certain embodiments, the internal walls comprises a thickness ranging from about 10 to about 500 nanometers, or about 10 to 250 nanometers, or about 50 to about 100 nanometers. In such embodiments, each integral internal hollow fiber can comprise an internal diameter ranging from about 10 to about 100, 200, 300, 400 or 500 nanometers. Further, the outside diameter of the resulting fiber can range from about 100 to about 1000, 2000, 3000, 4000 or 5000 nanometers. In certain embodiments, the outside diameter can range from about 1 micron to about 50 microns, or from about 1 micron to about 10 microns.

According to embodiments of the present invention, a carbon fiber having a honeycomb-like cross section, wherein a plurality of integral internal hollow fibers are bundled within an outer wall, can comprise an outside diameter of the outer wall ranging from about 1 micron to about 50 microns. Alternatively, the outside diameter can range from about 1 micron to about 10 microns or preferably from about 3 to about 10 microns. These tows can be graphitized in the conventional manner and supplied for use in forming composite materials or fabrics for composite materials. For example, a composite can be formed comprising layers of sheets comprising continuous carbon fibers with nanoscale features according to the present invention. Likewise, a prepreg comprising a cloth comprising carbon fibers with nanoscale features according the present invention can be produced.

In alternative embodiments, other polymers, such as pitch or polyphenylene sulfide may be substituted for the melt-spinnable PAN described herein. Pitch is the name for any of a number of highly viscous liquids which appear solid at room temperature and include a mixture of predominantly aromatic and alkyl-substituted aromatic hydrocarbons. Pitch can be made from petroleum products or plants. Petroleum-derived pitch is also called bitumen while pitch produced from plants is also known as resin. Preferably, the pitch polymer comprises a mesophase pitch. When heated, pitch materials form an isotropic mass. As heating continues, spherical bodies begin to form. The spherical bodies are of an anisotropic liquid-crystalline nature. These spheres continue to grow and coalesce until a dense continuous anisotropic phase forms, which phase has been termed the "mesophase." Thus, the mesophase is the intermediate phase or liquid crystalline region between the isotropic pitch and the semi-coke obtainable at higher temperatures. In one particular embodiment, the mesophase pitch comprises Mitsubishi ARA24 naphthalene-based synthetic pitch or the like. Mesophase pitch suitable for certain embodiments of the present invention can be extracted from natural pitch. For example, mesophase pitch can be solvent extracted from isotropic pitch containing mesogens as described in U.S. Pat. No. 5,032,250, the contents of which are hereby incorporated by reference. U.S. Pat. Nos. 4,277,324 and 4,208,267 also describe processes for obtaining mesophase pitch by treating itostropic pitch; the contents of each are hereby incorporated by reference. An isotropic pitch comprises molecules which are not aligned in optically ordered crystals and mesogens are mesophase-forming materials or mesophase precursors. In other alternative embodiments, polyphenylene sulfide is substituted for the melt-spinnable PAN. Polyphenylene sulfide is considered as an important high-temperature polymer because it exhibits a number of desirable properties. For instance, polyphenylene sulfides desirably exhibit resistance to heat, acids and alkalis, to mildew, to bleaches, aging, sunlight, and abrasion. In one alternative embodiment, the continuous carbon nanofiber comprises a long chain synthetic polysulfide in which at least 85% to about 99% of the sulfide linkages are attached directly to two aromatic rings. In particular embodiments, a polyarylene sulfide resin composition is substituted for the PAN. For instance, the resin composition can include at least 70 mole % of p-phenylene sulfide units (e.g., 70 mole % to 100 mole % or 80 mole % to 90 mole %) represented by the following structure:

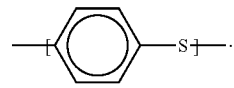

In such compositions, the balance or remaining 30 mole % can include any combination of the following bonds:

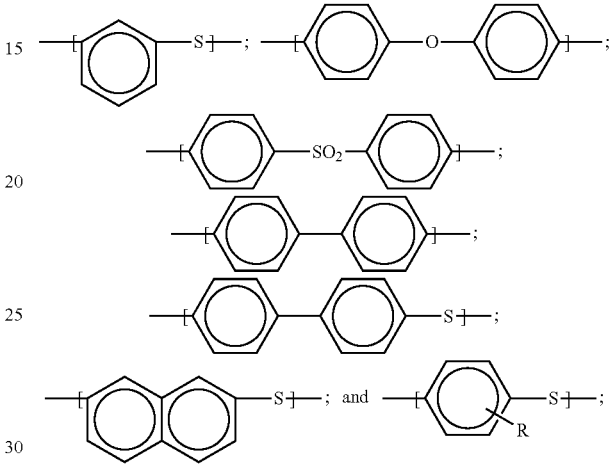

wherein R is selected from the group consisting of an alkyl or an alkoxy group having from 1 to 12 carbon atoms, a phenyl group and a nitro group. In various embodiments, the resin compositions can also include metal hydroxides and/or iron oxides. Suitable resin compositions are provided in U.S. Pat. No. 5,021,497, the contents of which are hereby incorporated by reference.

In another aspect, the invention comprises a method of forming a continuous carbon nanofiber structure by melt spinning a resin mixture comprising a melt-spinnable-polyacrylonitrile (PAN) polymer and from about 0.01% to about 10% of carbon nanotubes. Methods according to embodiments of the present invention include steps of providing a resin mixture comprising from about 50 to about 99.9% of a melt-spinnable-polyacrylonitrile (PAN) polymer and from about 0.01% to about 10% of carbon nanotubes. The carbon nanotubes can be dispersed within the mixture by mechanical and/or chemical means (e.g., dispersants or surfactants). The resin mixture can be extruded and fed into a spin-pack assembly capable of producing fibers comprising nanoscale dimensions and substantially aligning the carbon nanotubes with the PAN. In various embodiments, a fugitive polymer which is dissociable from the melt-spinnable PAN is provided to a separate extruder. The resin mixture and the fugitive polymer can be separately extruded and fed into a spin-pack assembly capable of producing multi-component fibers comprising nanoscale dimensions in an islands-in-the-sea configuration and substantially aligning the carbon nanotubes with the PAN polymer. If an islands-in-the-sea configuration is being produced, various methods include extracting the fugitive polymer from the multi-component fibers to form PAN fibers. These fibers can be oxidized by sufficiently heating the PAN fibers. Oxidation can involve heating the PAN fibers to around 300° C. The PAN polymer changes from a ladder structure to a stable ring structure as understood by those skilled in the art.

To form continuous carbon fibers, which are reinforced by carbon nanotubes being substantially aligned therewith, the oxidized PAN fibers are subjected to a carbonization. Carbonization can comprise heating of the oxidized fibers to a temperature ranging from about 600 to about 3000° C.

In one preferred embodiment, the method comprises feeding an extruded resin mixture comprising a PAN polymer and carbon nanotubes and a fugitive polymer to an appropriately designed spin pack (e.g., spinneret). In an alternative embodiment, only a resin mixture including a PAN polymer and carbon nanotubes is fed to the spinneret. These embodiments do not produce an islands-in-the-sea configuration, while embodiments feeding both a mixture including a PAN polymer and carbon nanotubes and a fugitive polymer are suitable for providing an islands-in-the sea-configuration. In one such embodiment, the resin mixture is fed to the spinneret to provide a plurality of PAN/carbon nanotube islands and the fugitive polymer comprises the sea. In one embodiment, the islands comprise hollow PAN/carbon nanotube fibers having a wall thickness ranging from about 10 to about 500 nanometers. However, other embodiments can comprise wall thicknesses and other geometrical dimensions discussed previously. In another embodiment, the resin mixture and the fugitive polymer are fed to the spinneret to provide a plurality of fugitive-polymer islands and a sea comprising the resin mixture.

Extrusion parameters for making multi-component continuous-filament fibers comprising a PAN polymer/carbon nanotube mixture and the fugitive polymer to provide a fiber having nanoscale dimensions according to embodiments described herein can vary depending on the properties desired. In general, however, to form a multi-component fiber, at least two polymers (e.g., PAN/carbon nanotube mixture and the fugitive polymer) are extruded separately and fed into a polymer-distribution system wherein the polymers are introduced into a spinneret plate. The polymers follow separate paths to the fiber spinneret and are combined in a spinneret hole. The spinneret is configured so that the extrudant has the desired overall fiber cross section (e.g., round, trilobal, etc.). Such a process is described, for example, in Hills U.S. Pat. No. 5,162,074, the contents of which are incorporated herein by reference in their entirety.

In various embodiments of the present invention, a melt-processable polyacrylonitrile polymer stream and a fugitive polymer stream are fed into the polymer-distribution system. The polymers typically are selected to have melting temperatures such that the polymers can be spun at a polymer throughput that enables the spinning of the components through a common capillary at substantially the same temperature without degrading one of the components.

Following extrusion through the die, the resulting thin fluid strands, or filaments, remain in the molten state for some distance before they are solidified by cooling in a surrounding fluid medium, which may be chilled air blown through the strands. Once solidified, the filaments are taken up on a godet or other take-up surface. For continuous filaments, the strands are taken up on a godet that draws down the thin fluid streams in proportion to the speed of the take-up godet.

Continuous-filament fiber may further be processed into staple fiber. In processing staple fibers, large numbers, e.g., 10,000 to 1,000,000 strands, of continuous filament are gathered together following extrusion to form a tow for use in further processing, as is known in that art. The use of such tows is likewise known in continuous-filament applications, as well. A finish solution may optionally be applied, to aid in fiber processing, as is known in the art. Such finish should be chosen so as not to interfere with downstream processes such as extraction and various heat treatments.

According to certain embodiments, a heightened molecular alignment can be achieved while producing the carbon-nanotube-reinforced fibers due to the geometric constraints imposed during spinning. These constraints are preferably greater than those realized when producing larger-diameter fibers. Additionally, the spinneret can be designed to allow for the tailoring of filament diameter and/or wall thickness. As such, a whole range of properties may be achieved.

While multi-component fibers are not new per se, polymer-distribution technology allowing the economical production of micro- and nano-sized fibers is relatively new. Spin-pack hardware components have historically been manufactured by conventional methods such as milling and drilling. Alternatively, a modern system can use techniques similar to printed-circuit-board technology to manufacture the spin-pack components. These precise components are then used to accurately distribute polymers in the extremely small area available in the spin pack. Such spin packs allow for the economical and practical production of micro- and nano-sized fibers. Such spin-packs can be provided by Hills, Inc. (W. Melbourne, Fla.).

Preferably, continuous carbon fibers with nanoscale features structures including carbon nanotubes substantially aligned therein according to embodiments of the present invention are produced by utilizing a spin pack having a distribution system that provides a level of precision to enable the production of nanoscale features within fiber/filament cross sections, especially nanoscale islands-in-a-sea type fibers. Preferably, the geometrical constraints imposed by the precise distribution system of such spin packs substantially align the carbon nanotubes along a longitudinal axis of the fiber. More specifically, the geometric constraints imposed by the choice of spin pack helps cause use the polymer molecules and the carbon nanotubes to become substantially aligned within the PAN. For instance, carbon nanotubes can be substantially aligned within the PAN throughout substantially the entire cross section of a PAN precursor having a honeycomb-like cross section. Likewise, carbon nanotubes can be substantially aligned with substantially the entire cross section of a continuous carbon fiber with nanoscale features having a honeycomb-like cross section According to various alternative embodiments, the melt-spinnable PAN can be replaced with other polymers such as pitch (preferably mesophase pitch) or polyphenylene sulfide. In one such embodiment, carbon nanotubes are blended in to molten pitch at or slightly above its softening temperature. The blend is then heated to an extrusion temperature which can be about 20° C. to about 30° C. above the softening temperature and a pitch fiber is extruded by melt spinning as discussed herein. The pitch-based fiber, having carbon nanotubes substantially aligned along a longitudinal axis of the fiber, is next oxidized and then carbonized.

In additional alternative embodiments, a solution of 10 to 50% by weight of a PAN in a solvent, preferably a highly polar solvent such as sodium thiocyanate or dimethylacetamide, is utilized. To this solution, carbon nanotubes are added so that the resulting PAN precursor includes an amount of carbon nanotubes ranging from about 0.05% to about 10% by weight of the PAN precursor. The PAN-based solution, having carbon nanotubes added thereto, is extruded through a multi-hole spinneret into a coagulation bath. As the solution exits the multi-hole spinneret and enters the bath it precipitates forming a multifilament bundle. Due to the geometric constraints of the spinneret, the carbon nanotubes are substantially aligned along a longitudinal axis of the PAN precursor. The bundle is washed to remove excess solvent, oxidized, and then carbonized to provide a continuous carbon nanofiber structure of carbon and carbon nanotubes. Beneficially, the nanotubes are substantially aligned along a longitudinal axis of the fiber. In various embodiments, the solution of PAN can comprise from 10% to 99.9% of a PAN, or 30% to 90%, or 40% to 60% by weight of a PAN in a solvent.

According to such solution-spinnable embodiments, solution-spinnable PANs can include any commercially available PAN suitable for solution spinning, such as a Mitsubishi® PAN (95% PAN, 5% methyl acrylate) or Amlon® (80% PAN, 20% methylacrylate) precursor materials. In some embodiments, the solution spinnable PAN can be replaced with other polymers such as isotropic pitches. Solution-spinnable PANs are commercially available from Japan Exlan Co., Ltd. (Osaka, Japan).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A polyacrylonitrile (PAN) precursor, comprising:
   (a) about 50% to about 99.9% by weight of a melt-spinnable PAN; and
   (b) about 0.01% to about 10% of carbon nanotubes.

2. A polyacrylonitrile (PAN) precursor according to claim 1, further comprising a fugitive polymer which is dissociable from the melt-spinnable PAN.

3. A polyacrylonitrile (PAN) precursor according to claim 2, wherein the fugitive polymer comprises a water-soluble polymer.

4. A polyacrylonitrile (PAN) precursor according to claim 2, wherein the fugitive polymer comprises an organic-solvent-extractable polymer.

5. A polyacrylonitrile (PAN) precursor according to claim 2, wherein the fugitive polymer comprises polylactic acid.

6. A polyacrylonitrile (PAN) precursor according to claim 2, wherein the fugitive polymer comprises a polyester.

7. A polyacrylonitrile (PAN) precursor according to claim 2; wherein the precursor comprises an islands-in-the-sea configuration.

8. A polyacrylonitrile (PAN) precursor according to claim 7; wherein the precursor comprises an islands-in-the-sea configuration such that the PAN comprises a plurality of islands and the fugitive polymer comprises the sea.

9. A polyacrylonitrile (PAN) precursor according to claim 7; wherein the precursor comprises an islands-in-the-sea configuration such that the fugitive polymer comprises a plurality of islands and the PAN comprises the sea.

10. A polyacrylonitrile (PAN) precursor according to claim 7, wherein the weight ratio of the PAN to the fugitive polymer ranges from about 20/80 to about 80/20.

11. A polyacrylonitrile (PAN) precursor, comprising:
    (a) about 50% to about 99.9% by weight of a PAN; and
    (b) about 0.01% to about 10% of carbon nanotubes.

12. A polyacrylonitrile (PAN) precursor according to claim 11, wherein the PAN comprises a solution-spinnable or a gel-spinnable PAN.

13. A polyacrylonitrile (PAN) precursor according to claim 12, further comprising a fugitive polymer which is dissociable from the solution-spinnable PAN.

14. A polyacrylonitrile (PAN) precursor according to claim 13; wherein the precursor comprises an islands-in-the-sea configuration such that the PAN comprises a plurality of islands and the fugitive polymer comprises the sea.

15. A polyacrylonitrile (PAN) precursor according to claim 13; wherein the precursor comprises an islands-in-the-sea configuration such that the fugitive polymer comprises a plurality of islands and the PAN comprises the sea.

16. A polyacrylonitrile (PAN) precursor according to claim 11, wherein the PAN comprises a pitch material.

17. A polyacrylonitrile (PAN) precursor according to claim 16, further comprising a fugitive polymer which is dissociable from the pitch material.

18. A polyacrylonitrile (PAN) precursor according to claim 17; wherein the precursor comprises an islands-in-the-sea configuration such that the pitch material comprises a plurality of islands and the fugitive polymer comprises the sea.

19. A polyacrylonitrile (PAN) precursor according to claim 17; wherein the precursor comprises an islands-in-the-sea configuration such that the fugitive polymer comprises a plurality of islands and the pitch material comprises the sea.

* * * * *